US008768346B2

(12) United States Patent
Zheng et al.

(10) Patent No.: US 8,768,346 B2
(45) Date of Patent: Jul. 1, 2014

(54) MOBILE PHONE AND NETWORK CONNECTING METHOD AND APPARATUS THEREOF

(75) Inventors: Zhengwei Zheng, Huizhou (CN); Cong Li, Huizhou (CN); Hai Zhao, Huizhou (CN)

(73) Assignee: Huizhou TCL Mobile Communication Co., Ltd., Huizhou, Guangdong Province (CN)

( * ) Notice: Subject to any disclaimer, the term of this patent is extended or adjusted under 35 U.S.C. 154(b) by 102 days.

(21) Appl. No.: 13/381,951

(22) PCT Filed: Dec. 16, 2010

(86) PCT No.: PCT/CN2010/079902
§ 371 (c)(1),
(2), (4) Date: Dec. 31, 2011

(87) PCT Pub. No.: WO2011/153804
PCT Pub. Date: Dec. 15, 2011

(65) Prior Publication Data
US 2012/0115465 A1 May 10, 2012

(30) Foreign Application Priority Data
Jun. 10, 2010 (CN) .......................... 2010 1 0206886

(51) Int. Cl.
*H04W 4/00* (2009.01)

(52) U.S. Cl.
USPC ......... 455/426.1; 455/438; 370/331; 370/254

(58) Field of Classification Search
USPC ................ 455/426.1, 438, 450; 370/331, 254
See application file for complete search history.

(56) References Cited

U.S. PATENT DOCUMENTS

| | | | | |
|---|---|---|---|---|
| 7,206,604 | B2 * | 4/2007 | Berra et al. | 455/560 |
| 2010/0061270 | A1 * | 3/2010 | Lee et al. | 370/254 |
| 2010/0222064 | A1 * | 9/2010 | Gao et al. | 455/450 |
| 2011/0292908 | A1 * | 12/2011 | Chin et al. | 370/331 |

* cited by examiner

*Primary Examiner* — David Q Nguyen
(74) *Attorney, Agent, or Firm* — Cheng-Ju Chiang

(57) ABSTRACT

A mobile terminal as well as a network connecting method and a network connecting apparatus thereof are disclosed in the present disclosure. The network connecting method comprises the following steps of: determining whether the network connecting mode is a dual-mode mode when the mobile terminal is connecting to a network; and if it is determined that the network connecting mode is the dual-mode mode, then setting the network connecting mode of the mobile terminal into a TD preference mode and connecting to the network. In the present disclosure, when the mobile phone is not in a 3G network or when the 3G signal is weak, the mobile phone that has been switched to a 2G network can re-initiate the network business without the need of firstly logging on the 3G network. This significantly reduces the network searching time, which is very convenient for the user.

12 Claims, 2 Drawing Sheets

MOBILE PHONE AND NETWORK CONNECTING METHOD AND APPARATUS THEREOF

CROSS REFERENCE TO RELATED APPLICATIONS

The present application is a 35 U.S.C. §371 National Phase conversion of International (PCT) Patent Application No. PCT/CN2010/079902, filed on Dec. 16, 2010, the disclosure of which is incorporated by reference herein. The PCT International Patent Application was published in Chinese.

FIELD OF THE INVENTION

The present disclosure generally relates to the technical field of communication, and more particularly, to a mobile terminal and a network connecting method and apparatus thereof.

BACKGROUND OF THE INVENTION

TD-SCDMA, the abbreviation for "Time Division-Synchronous Code Division Multiple Access" (also abbreviated as TD), is the first complete mobile communication standard developed by China communication industries ever since.

As a proprietary intellectual property of China, TD-SCDMA incorporates the advantages of Code Division Multiple Access (CDMA), Time Division Multiple Access (TDMA) and Frequency Division Multiple Access (FDMA) together. Therefore, TD-SCDMA coexists with the WCDMA standard in Europe and the CDMA2000 standard in the United States as the mainstream 3G mobile communication standards.

A TD-SCDMA/GSM dual-mode mobile phone can operate in both a single-mode mode and a dual-mode mode.

In the single-mode mode, connection to the network can be accomplished according to a current standard, for example, according to TD in a TD only mode or according to GSM in a GSM only mode. In the dual-mode mode, the mobile phone operates in a TD preference mode; i.e., TD is preferentially adopted for network connection.

When dialing up to a website www in the TD preference mode, it is required that no switching is made when there is a 3G signal; and when strength of the 3G signal is too low, the GPRS will be disconnected and then it is allowed to switch to a 2G network. Then, when the user dials up to the website www again in the dual-mode mode, the system will firstly determine whether it is currently in a 3G network. If it is currently not in a 3G network, then the system will compulsively log on the 3G network; and if it fails to log on the 3G network, it means that the process of dialing up to the website www fails and an indication of "the 3G signal is weak or there is no 3G network" is given.

As can be known from the above descriptions, when the mobile phone in the dual-mode mode is not in a 3G network or when the 3G signal is weak, the mobile phone that has been switched to a 2G network must firstly try to log on the 3G network when re-initiating the network business. This makes the network searching time too long, which is very inconvenient for the user.

SUMMARY OF THE INVENTION

An objective of the present disclosure is to provide a mobile terminal as well as a network connecting method and a network connecting apparatus for a mobile terminal, which can solve the problem that a mobile phone must firstly log on a 3G network during network switching and the network searching time is too long in case there is no 3G network or the 3G signal is weak.

To achieve the aforesaid objective, the present disclosure provides the following technical solutions.

The present disclosure provides a network connecting method for a mobile terminal, which comprises the following steps of:

determining whether the network connecting mode is a dual-mode mode when the mobile terminal is connecting to a network; and if it is determined that the network connecting mode is the dual-mode mode, then setting the network connecting mode of the mobile terminal into a TD preference mode and connecting to the network.

Preferably in an embodiment, the network connecting method for a mobile terminal according to the present disclosure further comprises the following steps when the GPRS connection is interrupted:

determining whether interruption of the GPRS connection is initiated by a user or an application initiatively; and if the answer is yes, then interrupting the GPRS connection, and otherwise, determining whether the network connecting mode before the GPRS connection is interrupted is the dual-mode mode; and if it is determined that the network connecting mode is the dual-mode mode, then setting the network connecting mode into the TD preference mode and continuing to connect to the network.

Preferably in an embodiment, the network connecting method for a mobile terminal according to the present disclosure further comprises the following step after the step of determining whether the network connecting mode is a dual-mode mode:

if it is determined that the network connecting mode is not the dual-mode mode, then connecting to the network in a corresponding single-mode mode.

Preferably in an embodiment of the network connecting method for a mobile terminal according to the present disclosure, the dual-mode mode comprises a TD mode or a GSM mode.

The present disclosure further provides a network connecting apparatus for a mobile terminal, which comprises:

a dual-mode mode determining module, being configured to determine whether the network connecting mode is a dual-mode mode;

a TD preference mode setting module, being configured to set the network connecting mode of the mobile terminal into a TD preference mode if the dual-mode mode determining module determines that the network connecting mode is the dual-mode mode; and a network connecting module, being configured to connect to the network.

Preferably in an embodiment, the network connecting apparatus for a mobile terminal according to the present disclosure further comprises:

an interruption determining module, being configured to determine whether an interruption is initiated by a user or an application initiatively.

Preferably in an embodiment of the network connecting apparatus for a mobile terminal according to the present disclosure, the network connecting module is further configured to, if the dual-mode mode determining module determines that the network connecting mode is not the dual-mode mode, connect to the network in a corresponding single-mode mode.

Preferably in an embodiment of the network connecting apparatus for a mobile terminal according to the present disclosure, the dual-mode mode comprises a TD mode or a GSM mode.

The present disclosure further provides a mobile terminal, which comprises the network connecting apparatus for a mobile terminal according to the aforesaid embodiments of the present disclosure.

In the embodiments of the present disclosure, whether the network connecting mode is a dual-mode mode is determined firstly when the mobile terminal is connecting to a network; and if it is determined that the network connecting mode is the dual-mode mode, then the network connecting mode of the mobile terminal is set into a TD preference mode and connection to the network is performed. In this way, when the mobile phone is not in a 3G network or when the 3G signal is weak, the mobile phone that has been switched to a 2G network can re-initiate the network business without the need of firstly logging on the 3G network. This significantly reduces the network searching time, which is very convenient for the user.

BRIEF DESCRIPTION OF THE DRAWINGS

In order to more clearly describe the technical solutions of the embodiments of the present disclosure, attached drawings to be used in the detailed description of the disclosure will be briefly described hereinbelow. Obviously, the attached drawings described hereinbelow only illustrate some of the embodiments of the present disclosure, and those of ordinary skill in the art can also obtain other attached drawings therefrom without the need of making inventive efforts, wherein.

DETAILED DESCRIPTION OF THE INVENTION

In order to make objectives, technical solutions and advantages of the present disclosure more apparent and obvious, embodiments of the present disclosure will be further detailed hereinbelow with reference to the attached drawings. However, it shall be appreciated that, the embodiments described herein are only intended to illustrate but not to limit the present disclosure.

Figure 1:
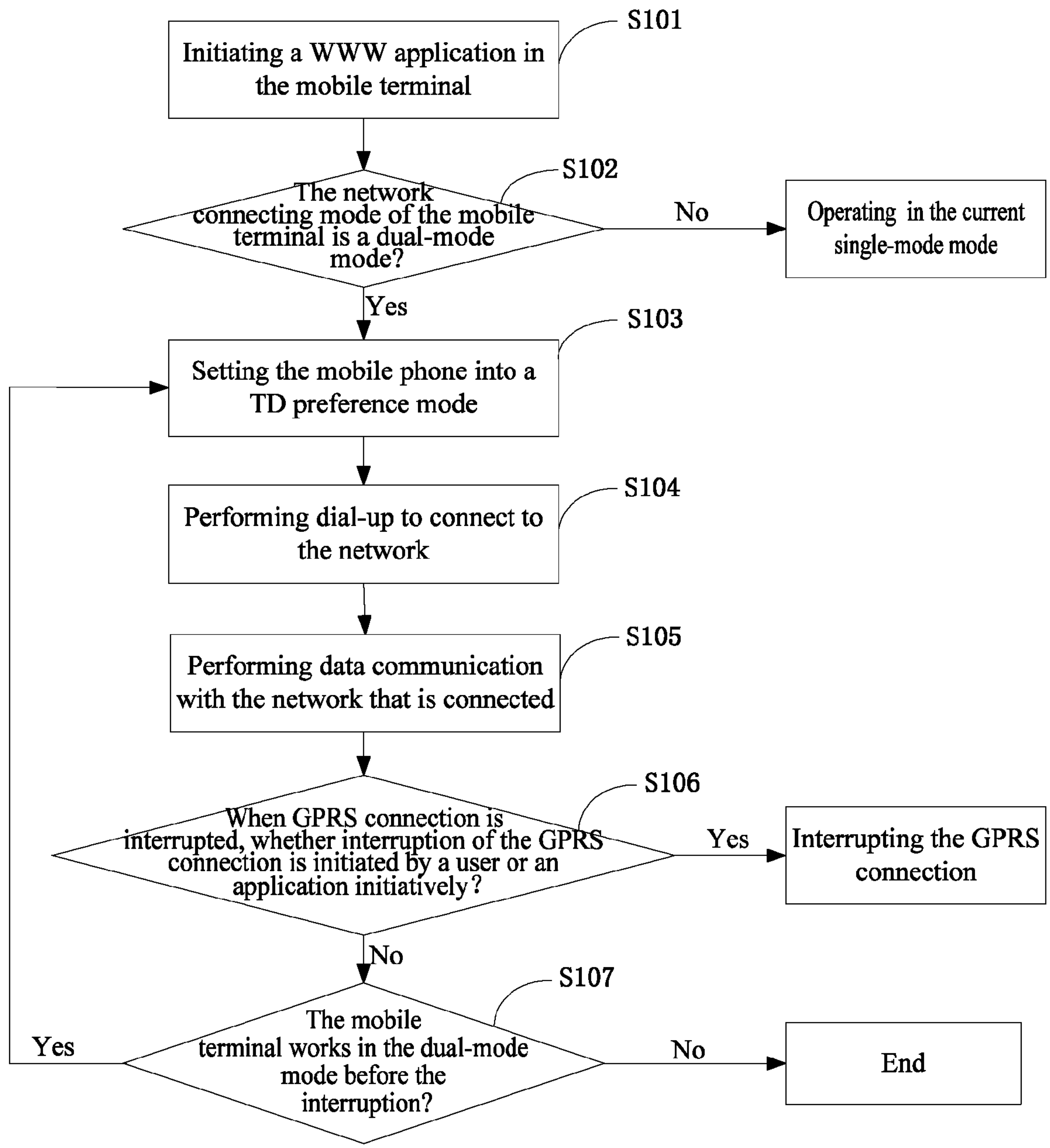
FIG. 1 is a flowchart diagram of a network connecting method for a mobile terminal according to an embodiment of the present disclosure.

FIG. 1 shows a flowchart of a network connecting method for a mobile terminal according to an embodiment of the present disclosure.

In a step S101, a WWW application in the mobile terminal is initiated.

In a step S102, whether the network connecting mode of the mobile terminal is a dual-mode mode is determined. If the answer is yes, then a step S103 is executed; and otherwise, the mobile terminal operates in the current single-mode mode.

The single-mode mode is a TD mode or a GSM mode and, of course, may also be other modes, which will not be enumerated herein.

In the step S103, the mobile phone is set into a TD preference mode.

In practical implementations, if the setting fails, then exception handling is performed.

In a step S104, dial-up is performed to connect to the network.

In practical implementations, if the dial-up fails, then failure handling is performed.

In a step S105, data interaction is performed with the network that is connected.

In a step S106, when the GPRS connection is interrupted, whether interruption of the GPRS connection is initiated by a user or an application initiatively is determined. If the answer is yes, then the GPRS connection is interrupted; and otherwise, a step S107 is executed.

In the step S107, whether the mobile terminal works in the dual-mode mode before the interruption is determined. If the answer is yes, then the step S103 is continued; and otherwise, this process is ended.

When the mobile phone that is set into the TD preference mode is not in a 3G network or when the 3G signal is weak, the mobile phone that has been switched to a 2G network can re-initiate the network business without the need of firstly logging on the 3G network. This significantly reduces the network searching time.

Figure 2:
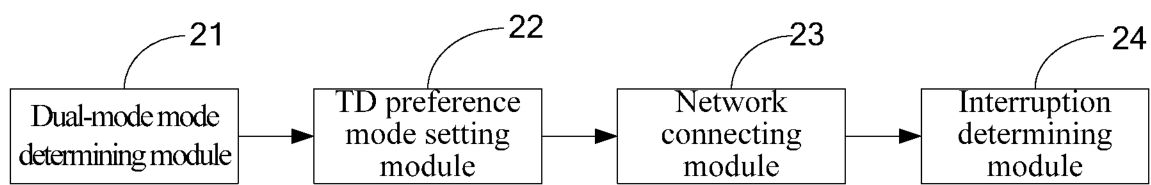
FIG. 2 is a structural view of a network connecting apparatus for a mobile terminal according to an embodiment of the present disclosure.

FIG. 2 shows a structure of a network connecting apparatus for a mobile terminal according to an embodiment of the present disclosure. The apparatus comprises a dual-mode mode determining module 21, a TD preference mode setting module 22, a network connecting module 23 and an interruption determining module 24.

When the mobile terminal is connecting to a network, the dual-mode mode determining module 21 determines whether the network connecting mode of the mobile terminal is a dual-mode mode.

If the dual-mode mode determining module 21 determines that the network connecting mode is the dual-mode mode, then the TD preference mode setting module 22 sets the network connecting mode of the mobile terminal into a TD preference mode, and the network connecting module 23 connects to the network through dial-up.

If the dual-mode mode determining module determines that the network connecting mode is not the dual-mode mode, the network connecting module 23 connects to the network in a corresponding single-mode mode, for example, in a GSM mode.

When the GPRS connection is interrupted, the interruption determining module 24 determines whether interruption of the GPRS connection is initiated by a user or an application initiatively. If the answer is yes, then the process is ended; and otherwise, the TD preference mode setting module 22 is controlled to set the network connecting mode into the TD preference mode, and the network connecting module 23 continues to connect to the network.

Preferably, the dual-mode mode comprises a TD mode or a GSM mode.

An embodiment of the present disclosure further provides a mobile terminal, which comprises the network connecting apparatus for a mobile terminal according to the aforesaid embodiments of the present disclosure. This apparatus has been detailed in the above description, so it will not be further described herein.

In the embodiments of the present disclosure, whether the network connecting mode is a dual-mode mode is determined firstly when the mobile terminal is connecting to a network; and if it is determined that the network connecting mode is the dual-mode mode, then the network connecting mode of the mobile terminal is set into a TD preference mode and connection to the network is performed. In this way, when the mobile phone is not in a 3G network or when the 3G signal is weak, the mobile phone that has been switched to a 2G network can re-initiate the network business without the need of firstly logging on the 3G network. This significantly reduces the network searching time, which is very convenient for the user.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A network connecting method for a mobile phone, comprising the following steps of:

the mobile phone determining whether the network connecting mode is a TD-SCDMA/GSM (Time Division-Synchronous Code Division Multiple Access/Global System for Mobile communications) dual-mode mode when the mobile phone is connecting to a network; and if it is determined that the network connecting mode is the TD-SCDMA/GSM dual-mode mode, then the mobile phone setting the network connecting mode of the mobile phone into a TD-SCDMA preference mode and connecting to the TD-SCDMA/GSM network.

2. The network connecting method for a mobile phone of claim 1, further comprising the following steps when GPRS (General Pocket Radio Service) connection is interrupted:

the mobile phone determining whether interruption of the GPRS connection is initiated by a user or an application initiatively; and if the answer is yes, then the mobile phone interrupting the GPRS connection, and otherwise, determining whether the network connecting mode before the GPRS connection is interrupted is the TD-SCDMA/GSM dual-mode mode; and if it is determined that the network connecting mode is the TD-SCDMA/GSM dual-mode mode, then the mobile phone setting the network connecting mode into the TD-SCDMA preference mode and continuing to connect to the network.

3. The network connecting method for a mobile phone of claim 1, further comprising the following step after the step of determining whether the network connecting mode is a TD-SCDMA/GSM dual-mode mode:

if it is determined that the network connecting mode is not the TD-SCDMA/GSM dual-mode mode, then the mobile phone connecting to the network in a corresponding single-mode mode.

4. A network connecting apparatus for a mobile phone, comprising:

a TD-SCDMA/GSM (Time Division-Synchronous Code Division Multiple Access/Global System for Mobile communications) mode determining module, being configured to determine whether the network connecting mode is a TD-SCDMA/GSM dual-mode mode;

a TD-SCDMA preference mode setting module, being configured to set the network connecting mode of the mobile phone into a TD-SCDMA preference mode if the TD-SCDMA/GSM mode determining module determines that the network connecting mode is the TD-SCDMA/GSM dual-mode mode; and a network connecting module, being configured to connect to the network.

5. The network connecting apparatus for a mobile phone of claim 4, further comprising:

an interruption determining module, being configured to determine whether an interruption is initiated by a user or an application initiatively.

6. The network connecting apparatus for a mobile phone of claim 4, wherein the network connecting module is further configured to, if the TD-SCDMA/GSM mode determining module determines that the network connecting mode is not the TD-SCDMA/GSM dual-mode mode, connect to the network in a corresponding single-mode mode.

7. A readable storage medium that stores a program, the program providing a network connecting method for a mobile phone, comprising steps of:

the mobile phone determining whether the network connecting mode is a TD-SCDMA/GSM (Time Division-Synchronous Code Division Multiple Access/Global System for Mobile communications) dual-mode mode when the mobile phone is connecting to a network; and if it is determined that the network connecting mode is the TD-SCDMA/GSM dual-mode mode, then the mobile phone setting the network connecting mode of the mobile phone into a TD TD-SCDMA preference mode and connecting to the network.

8. The readable storage medium of claim 7, further comprising the following steps when the GPRS (General Pocket Radio Service) connection is interrupted:

the mobile phone determining whether interruption of the GPRS connection is initiated by a user or an application initiatively; and if the answer is yes, then the mobile phone interrupting the GPRS connection, and otherwise, determining whether the network connecting mode before the GPRS connection is interrupted is the TD-SCDMA/GSM dual-mode mode; and if it is determined that the network connecting mode is the TD-SCDMA/GSM dual-mode mode, then the mobile phone setting the network connecting mode into the TD-SCDMA preference mode and continuing to connect to the network.

9. The readable storage medium of claim 7, further comprising the following step after the step of determining whether the network connecting mode is a TD-SCDMA/GSM dual-mode mode:

if it is determined that the network connecting mode is not the TD-SCDMA/GSM dual-mode mode, then the mobile phone connecting to the network in a corresponding single-mode mode.

10. A mobile phone, comprising a program storage medium, as described in the program comprising:

determining whether a network connecting mode is a TD-SCDMA/GSM (Time Division-Synchronous Code Division Multiple Access/Global System for Mobile communications) dual-mode mode;

if it is determined that the network connecting mode is the TD-SCDMA/GSM dual-mode mode, then setting the network connecting mode of the mobile phone into a TD-SCDMA preference mode and connecting to the network.

11. The mobile phone of claim 10, further comprising the following steps when the GPRS (General Pocket Radio Service) connection is interrupted:

determining whether interruption of the GPRS connection is initiated by a user or an application initiatively; and if the answer is yes, then interrupting the GPRS connection, and otherwise, determining whether the network connecting mode before the GPRS connection is interrupted is the TD-SCDMA/GSM dual-mode mode; and if it is determined that the network connecting mode is the TD-SCDMA/GSM dual-mode mode, then setting the network connecting mode into the TD-SCDMA preference mode and continuing to connect to the network.

12. The mobile phone of claim 10, further comprising the following step after the step of determining whether the network connecting mode is a TD-SCDMA/GSM dual-mode mode:

if it is determined that the network connecting mode is not the TD-SCDMA/GSM dual-mode mode, then connecting to the network in a corresponding single-mode mode.

* * * * *